United States Patent [19]
Barry et al.

[11] Patent Number: 5,596,416
[45] Date of Patent: Jan. 21, 1997

[54] MULTIPLE PRINTER MODULE ELECTROPHOTOGRAPHIC PRINTING DEVICE

[75] Inventors: Michael W. Barry; Francis A. Rowe, both of Duluth; E. Neal Tompkins, Atlanta, all of Ga.

[73] Assignee: T/R Systems, Norcross, Ga.

[21] Appl. No.: 180,636

[22] Filed: Jan. 13, 1994

[51] Int. Cl.[6] .............................. H04N 1/21; H04N 1/46; G03G 21/00

[52] U.S. Cl. ........................ 358/296; 358/501; 358/401; 399/381

[58] Field of Search ................................. 355/321, 322, 355/323; 395/101, 109, 114, 115, 116; 358/401, 501, 524, 296

[56] References Cited

U.S. PATENT DOCUMENTS

| | | | |
|---|---|---|---|
| 4,373,798 | 2/1983 | Tsukada et al. | 355/3 DD |
| 4,959,692 | 9/1990 | Hayashi et al. | 355/253 |
| 5,012,285 | 4/1991 | Oka et al. | 355/245 |
| 5,143,017 | 9/1992 | Haneda et al. | 118/658 |
| 5,208,640 | 5/1993 | Horie et al. | 355/321 |

*Primary Examiner*—Peter S. Wong
*Assistant Examiner*—Gregory J. Toatley, Jr.
*Attorney, Agent, or Firm*—Gregory M. Howison

[57] ABSTRACT

A multiple print engine system includes a plurality of print engine modules (10) that are arranged in a parallel configuration. Each of the print engine modules (PEMs) is a dedicated print engine having an associated photoconductor drum (44) and a transfer drum (42). Paper is pulled from an associated paper bin (78) or (80) and passed through the transfer nip (46) between the two drums (44) and (42). The printed copy, either made by a monochrome process or a multipass color process, is then passed through a fuser (74) to a print buffer (16) which has an associated print buffer path (104). The paper is maintained in the print buffer until it is selected by the output combiner (20). The output combiner (20) extracts the paper from the print buffer (16) at a faster rate than it was processed by the associated one of the print engines (10). The images are distributed to the various print engines by an image distributor (30) which determines which image is associated with which engine. A print manager (32) determines which of the copies in the print buffers (16) are output to the output combiner (20) and, subsequently, to an output bin.

32 Claims, 10 Drawing Sheets

TANDEM PRINTER | MPS PRINTER

| Tandem Printer | Time | MPS Printer |
|---|---|---|
| PG 1 BGN | | PG 1-4 BGN |
| PG 1 FIN, PG 2 BGN | | |
| | 10 | PG 1 FIN, PG 5 BGN, PG 1 EJ |
| PG 2 FIN, PG 3 BGN | | PG 3 FIN, PG 6 BGN |
| | | PG 2 FIN, PG 7 BGN, PG 2 EJ, PG 3 EJ |
| | | PG 4 FIN, PG 8 BGN, PG 4 EJ |
| PG 3 FIN, PG 4 BGN | | |
| | 20 | |
| | | PG 6 FIN, PG 9 BGN |
| | | PG 7 FIN, PG 8 FIN, PG 10 BGN |
| PG 4 FIN, PG 5 BGN | | PG 5 FIN, PG 5, 6, 7, 8 EJ |
| | 30 | PG 9 FIN, PG 9 EJ |
| | | PG 10 FIN, PG 10 EJ |
| PG 5 FIN, PG 6 BGN | | |
| PG 6 FIN, PG 7 BGN | 40 | |
| PG 7 FIN, PG 8 BGN | | |
| PG 8 FIN, PG 9 BGN | | |
| | 50 | |
| PG 9 FIN, PG 10 BRN | | |
| PG 10 FIN | | |
| | 60 | |

FIG. 6

MULTIPLE PRINTER MODULE ELECTROPHOTOGRAPHIC PRINTING DEVICE

TECHNICAL FIELD OF THE INVENTION

The present invention pertains in general to color electrophotographic printers and, more particularly, to a plurality of print engines arranged in parallel to process print jobs in a parallel manner.

BACKGROUND OF THE INVENTION

Electrophotographic print engines have been utilized with both printers and copiers. In a printer, the print engine is typically interfaced with a computer to select and organize fonts or bit map the images. In a copier application, the print engine is interfaced with an input device that scans the image onto the photoconductor drum of the print engine. However, a CCD device could also be utilized in this application in the form of a CCD scanner. In either of the applications, a conventional print engine for a monochrome process would typically feed a single sheet of paper and pass it by the photoconductor drum for an image transfer process and then pass it to a fuser. Thereafter, the completed sheet will be output. Multiple copy print jobs will sequentially feed the paper in a serial manner. The speed of the printer is a function of the speed at which the image can be created, the speed at which the image can be transferred to the paper and the speed of the fuser. As increased output is required, the speed of each of these elements must be increased.

In a monochrome process, only one transfer operation is required. However, in a multipass color process, multiple images must be superimposed on one another on the sheet of paper in a direct transfer system, thus requiring multiple passes of the paper or image carrier through the print engine. In a double transfer system, the image is disposed on an intermediate drum and then the composite image transferred to the paper or image carrier. In a multiple print job on a direct transfer system, this requires each sheet of paper to be printed in a serial manner by passing it through the print engine. For either the monochrome process or the color process, a conventional serial feed print engine has the output thereof defined by the speed of the input device and the speed of the print engine itself.

One technique that has been utilized to increase throughput is a tandem print engine. In a tandem print engine, multiple colors can be disposed on the sheet of paper or the image carrier at different stations that are disposed in serial configuration. In this manner, the speed is the same for one, two, three or four color printing.

SUMMARY OF THE INVENTION

The present invention disclosed and claimed herein comprises a multiple print engine. The multiple print engine includes a plurality of electrophotographic print engine modules, each of the modules operable to receive an image file and print an image on an image carrier that is associated with the image file. A plurality of print buffers are provided, each associated with the output of at least one of the print engine modules. The print buffers are operable to receive the output of the associated one of the print engine modules as a completed print job. An output collator is provided for selectively feeding the output of each of the plurality of buffers.

In another aspect of the present invention, an image distributor is provided for distributing an input sequence of images to each of the print engine modules in a predetermined order. A print manager is provided for determining the sequence in which the output of the print buffers are retrieved. In one embodiment, the output sequence is the same as the input sequence to the image distributor.

In a further aspect of the invention, a print completion indicator is provided for indicating when each of the print engine modules has completed a print job and is ready to receive another image file. A failure indicator is provided for indicating when a print engine module has not completed a print job and does not generate the print complete indication. In this event, the image file is stored in a buffer and the image distributor can thereafter route this to another print engine module for completion of the print job.

In yet another aspect of the present invention, each of the print engine modules is operable to complete a print job at a first print speed. The collator is operable to retrieve each of the print jobs from the print buffers and route them to a single output at a second speed. The second speed is faster than the first speed.

BRIEF DESCRIPTION OF THE DRAWINGS

For a more complete understanding of the present invention and the advantages thereof, reference is now made to the following description taken in conjunction with the accompanying Drawings in which:

FIG. 6 illustrates a timing diagram for throughput between a multiple print engine printer and a tandem printer;

DETAILED DESCRIPTION OF THE INVENTION

Figure 1:
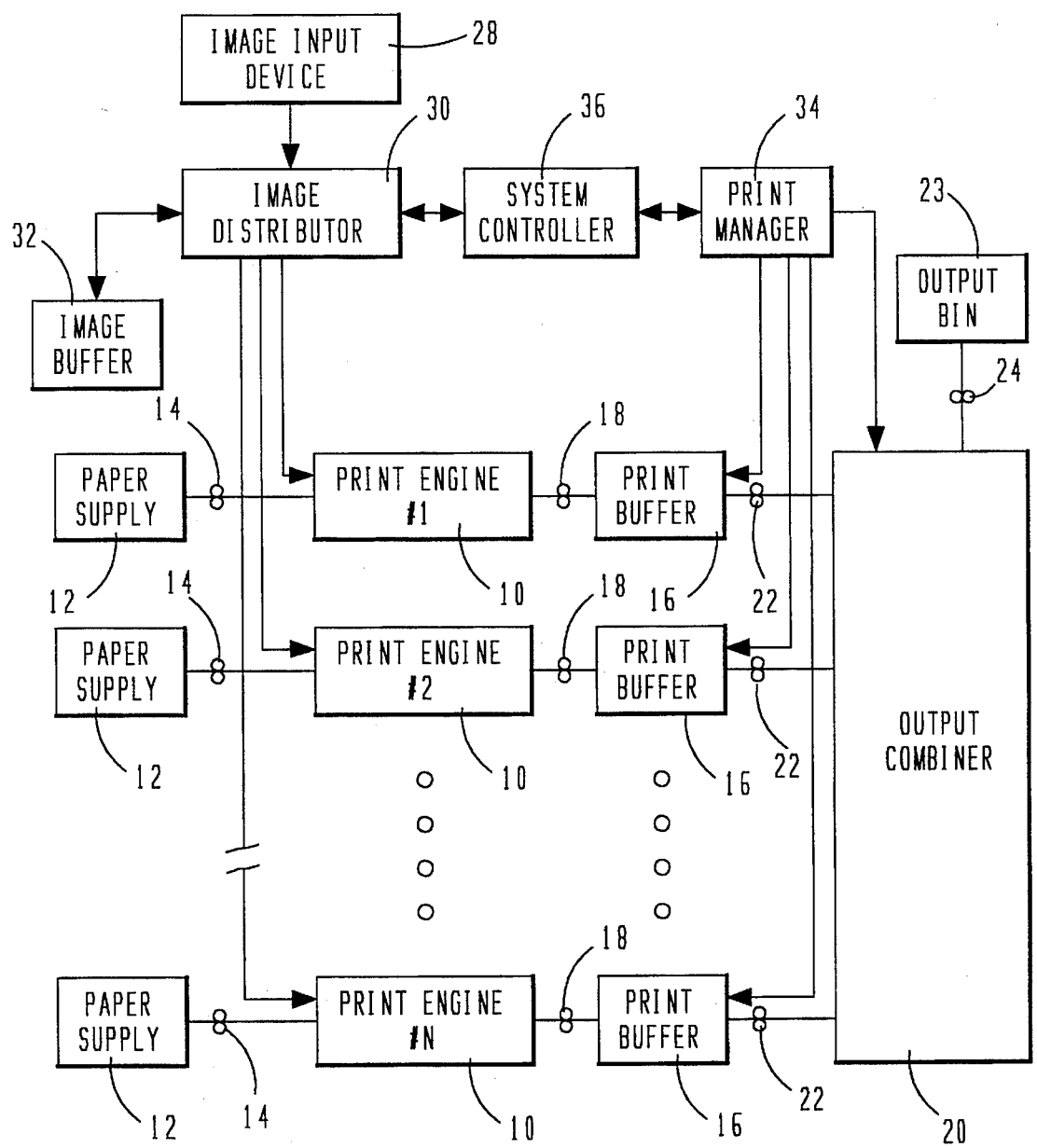
FIG. 1 illustrates an overall block diagram of the multiple module print engine.

Referring now to FIG. 1, there is illustrated a block diagram of the overall print engine system. A plurality of print engines 10 are provided, each print engine 10 operable to receive an image in electronic form, convert this image to a latent image disposed on a photoconductor drum (not shown), develop it and then transfer it to an image carrier such as paper, for transfer to a fuser and then output therefrom. This will be described in more detail hereinbelow. These print engines 10 can operate as either a black and white engine or a color engine requiring multiple passes. Each of the print engines 10 is interfaced with a dedicated paper supply bin 12 which is operable to feed paper to the associated print engine 10 through a feed roller device 14. At the output, each of the print engines 10 is operable to feed the paper and the image disposed thereon to an associated print buffer 16 via a paper feed device 18. Thereafter, the print buffers can be controlled to selectively output the contents thereof through an output combiner 20 via a feed roller 22. As will be described hereinbelow, the speed of the feed rollers 22 can be varied relative to the speed of the print rollers 18. The output combiner 20 operates at a much higher speed than the print rollers 18, as it must collect the outputs of all of the print buffers or portions thereof. The output combiner 20 is operable to output the paper collected from each of the print buffers 16 to an output bin 23 via a feed device 24.

The image is provided through an image input device 28 which, for a related printer application, can be a PC, and for a copier application can be a CCD scanner. The image input device 28 is then operable to provide an electrically coded image signal to an image distributor 30, which image can then be stored in an image buffer 32. The image distributor 30 is operable to select and output the image of each page to select ones of the print engines 10 in accordance with a parsing algorithm.

The printing operation is controlled by a print manager 34, which is operable to control each of the print buffers 16. Each of the print buffers 16 is operable to store a sheet of paper and then selectively "eject" that sheet of paper upon receiving a command from the print manager 34. The print manager 34 also controls the output combiner 20 to determine the speed at which it pulls paper from the print buffer 16. The overall system is controlled by a system controller 36.

In operation, a print job is input to the system through the input device 28. This is a sequential operation. At this time, the image distributor 30 can determine which of the print engines 10 will print which copy. Since each page can have a different content thereto, the processing time for each page will vary, dependent upon the amount of time required to create the latent image on the photoconductor drum. The image distributor 30 determines this and then routes the page to a given one of the print engines 10. The print manager 32 operates in conjunction with the image distributor 30 such that, when the image is successfully transferred to the paper and is stored in the print buffer 16, the correct order in which the pages have been entered can be reconstructed, as will be described in more detail hereinbelow. In order to do this, however, the speed at which the paper is extracted from the print buffer 16 is much faster than the speed at which the paper is input to the print buffer 16. Further, since each sheet of paper may take a different amount of time to process and dispose the sheet in the print buffer 16, the speeds of the driving devices 22 may be varied even relative to each other.

Figure 2:
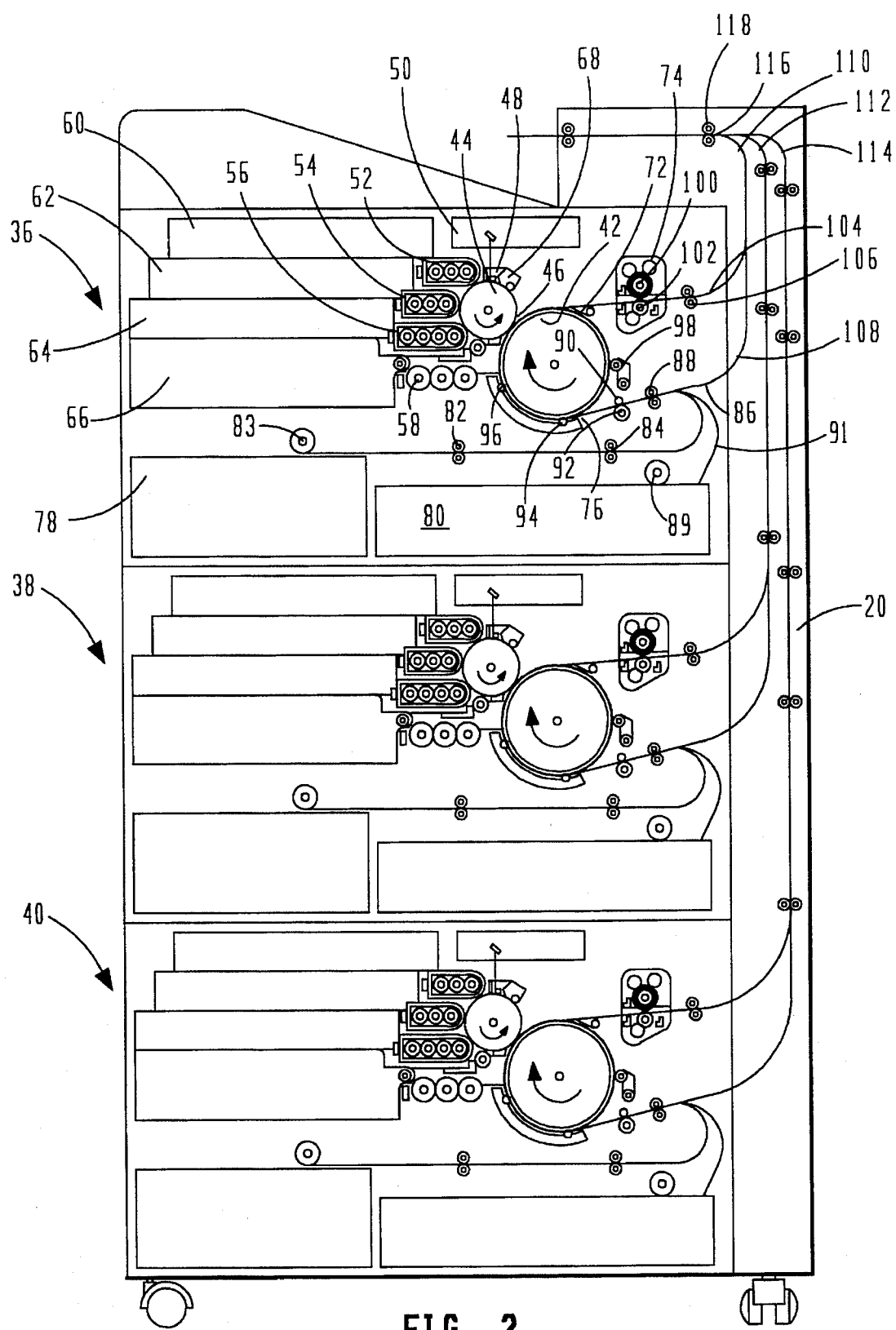
FIG. 2 illustrates a cutaway side view of a three module multiple print engine.

Referring now to FIG. 2, there is illustrated a cutaway side view of a three print engine module parallel printer which includes three print engines 36, 38 and 40, all stacked one on top of the other. Each of the engines 36, 38, 40 is a multi-pass engine and includes a transfer drum 42 and a photoconductor drum 44. The photoconductor drum 44 rotates in a counterclockwise direction and is pressed against the transfer drum 42 to form a nip 46 therebetween. The photoconductor drum 44 is operable to have the surface thereof charged with a corona 48 and then an imaging device 50 is provided for generating a latent image on the charged surface of the photoconductor drum 44. The undeveloped latent image is then passed by four developing stations, three color developing stations, 52, 54 and 56 for the colors yellow, magenta and cyan, and a black and white developing station 58. The color developing stations 52, 54 and 56 each have a respective toner cartridge 60, 62 and 64 associated therewith. The black and white developing station 58 has a black and white toner cartridge 66 associated therewith. Although not described hereinbelow, each of the developing stations 52, 54, 56 and 58 and toner cartridges 60, 62, 64 and 66 can be removed as individual modules for maintenance thereof.

During the print operation, the photoconductor drum 44 is rotated and the surface thereof charged by the corona 48. An undeveloped latent image is then formed on the surface of the photoconductor drum 44 and then passed under the developing stations 52, 54, 56 and 58. In a multi-pass operation, the latent image is generated and only one color at a time utilized in the developing process for the latent image. This latent image is then passed through the nip 46 and transferred to an image carrier, such as paper, which is disposed on the surface of the transfer drum 42. Thereafter, the surface of the drum 44 is passed under a cleaning station 68, which is operable to remove any excess toner particles which were not passed over to the transfer drum 42 during the transfer operation and also discharges the surface of the drum 44. The system then begins generation of another latent image, either for a different color on the same sheet of paper or the first color on a different sheet of paper.

In the color operation, multiple passes must be made such that the image carrier, i.e., paper, remains on the surface of the transfer drum 42 for the multiple passes. In the first pass, the first latent image is transferred to the surface of the photoconductor image carrier and drum 44, developed and then the development is transferred to the image carrier maintained on the transfer drum 42. The development of the next latent image of the next color is superimposed on the development of the first latent image, it being noted that the registration is important. This registration is provided by the mechanical alignment of the various drums, drive mechanisms, etc. Thereafter, the third color latent image is developed and disposed on the image carrier followed by the fourth color latent image.

After the last color latent image is development and disposed on the image carrier in the color process, a picker mechanism 72 comes down on the surface of the transfer drum 42 in order to lift up the edge of the image carrier or paper. This is then fed to a fuser mechanism 74.

The image carrier is typically comprised of a predetermined weight paper. The transfer drum 42 utilizes electrostatic gripping for the purpose of adhering the paper to the surface of the transfer drum 42 for multiple passes. This therefore utilizes some type of charging mechanism for charging the surface of the drum 42 at an attachment point 76 where the paper is fed onto the surface of the transfer drum 42. The transfer drum 42 is, in the preferred embodiment, manufactured from a controlled resistivity type material that is disposed over an aluminum support layer which is a hollow cylindrical member. A voltage supply is provided that provides a uniform application of voltage from the voltage supply to the underside of a resilient layer that is disposed over the surface of the aluminum support member. This resilient layer is fabricated from a carbon filled elastomer or material such as butadaiene acrylonitorile, which has a thickness of approximately 3 mm. Overlying this resilient layer is a controlled resistivity layer which is composed of a thin dielectric layer of material at a thickness of between 50 and 100 microns. This controlled resistivity layer has a non-linear relationship between the discharge (or relaxation) point and the applied voltage such that, as the voltage increases, the discharge time changes as a function thereof. The paper is then disposed over the surface of the drum. The construction of this drum is described in U.S. Pat. No. 5,459,560, issued Oct. 17, 1995, and entitled, "Buried Electrode Drum for an Electrophotographic Print Engine with a Controlled Resistivity Layer" (Atty. Dkt. No. TRSY-21,888), which is a continuation-in-part of U.S. patent application Ser. No. 07/954,786, filed Sep. 30, 1992, and entitled, "Buried Electrode Drum for an Electrophotographic Print Engine" (Atty. Dkt. No. TRSY-21,072), which U.S. patent application Ser. No. 07/954,786, is incorporated herein by reference.

The paper is retrieved from one of two paper supply bins 78 or 80. The paper supply bin 78 contains one type of paper, typically 8½"×11" paper, and the paper bin 80 contains another type of paper, typically 8½"×14" paper. The paper bin 78 has the paper stored therein selected by a first gripping roller 83, which is then fed along a paper path 80 into a nip 82 between two rollers and then to a nip 84 between two rollers. This is then fed to a paper path 86 to feed into a nip 88 between two rollers. The paper in the nip 88 is then fed into a nip formed between two precurl rollers 90 and 92, which have different durometers to cause the paper to have a curl bias applied thereto in the direction of the curvature of rotation of the transfer drum 42. The operation of the pre-curl rollers is described in detail in U.S. Pat. No. 5,398,107, filed Mar. 14, 1995, and entitled, "Apparatus for Biasing the Curvature of an Image Carrier on a Transfer Drum" (Atty. Dkt. No. TRSY-22,574). The paper from the bin 80 is extracted by a gripping roller 89 and pushed along a paper path 91 to the nip 88 and therefrom to the pre-curl rollers 90 and 92.

The paper is fed from the nip between the two pre-curl rollers 90 and 92 at the attachment point 76. At the attachment point 76, an attachment electrode roller 94 is provided which is operable to operate on a cam mechanism (not shown) to urge the roller 94 against the surface of the drum 42 to form the attachment nip 76. This is done during the initial attachment of the paper to the drum 42. Typically, this attachment electrode roller 94 is connected to ground. The surface of the drum 42 is charged to a positive voltage of between 800–1,000 volts. The voltage is disposed on the surface of the drum 42 by a positive electrode roller 96 that contacts the surface of the drum 42 at a point proximate to the photoconductor drum 44. Since the electrode 94 is grounded, the voltage will decrease along the surface thereof until a lower voltage is present at the attachment point 76. When the paper reaches the transfer nip 46, the portion of the surface of the photoconductor drum 44 in the nip 46 has a potential thereof reduced to ground such that the charged particles will be attracted from the surface of the photoconductor drum 44 to the surface of the paper on the drum 42.

For a multiple pass operation, the attachment electrode 94 will be pulled outward from the drum 42 and the paper allowed to remain on the drum 42 and go through the transfer nip 46 for another pass. When the final pass has been achieved at the transfer nip 46, the picker 72 is swung down onto the surface of the drum 42 to direct the paper on the surface of the drum 42 to the fuser 74. A discharge electrode 98 is then swung down into contact with the drum 42 to provide a discharge operation before the surface of the drum enters the nip 76 for the next paper attachment process.

When the paper is fed into the fuser 74, it is passed into a nip between two rollers 100 and 102, both of which have different durometers. Typically, there is one roller that is formed from a metallic material and one roller that is formed of a soft material. The rollers are oriented with the roller 100 having the smaller durometer, such that a reverse bias curl will be applied to the paper that is the opposite direction of the curvature of the drum 42. This will remove the curvature added to the paper. One of the rollers 100 is heated such that the transferred image is "fused". The paper is then fed into a paper path 104 by a pair of rollers 106, which, as will be described hereinbelow, is a "buffered" paper region. A duplex paper path 108 is also provided, which will be described hereinbelow.

Thus far, the operation of the print engine has been described as a conventional electrophotographic print engine. However, the use of the buffer path 104 is different, as will be described hereinbelow. Each of the roller pairs 106 operates at the speed of the associated one of the print engines 36, 38 or 40 to dispose the paper in the associated one of the buffered paper paths 104. Thereafter, the paper is input to the output combiner 20. The paper path 104, has a plurality of rollers (not shown) associated therewith for each of the print engines 36, 38 and 40, as will be described hereinbelow.

Each of the paper buffer paths 104 is operable to feed the paper up to one of three output paper path points 110, 112 and 114, associated with either of the print engines 36, 38 and 40, respectively. Thereafter, the print manager 32 controls the rollers associated with each of the print buffer paths 104 to selectively move the paper into a nip 116 between a roller pair 118. When this occurs, the paper is led at a much higher speed than the speed with which it was initially placed into the buffer path 104. Therefore, the rollers pair 106 that inputs the paper to the print buffer path 104 operates at the speed of the print engine, whereas the rollers internal to the buffer paper path 104 and the output roller 116 of the output roller pair 118 operate at a variable speed, depending upon the speed at which the paper must be extracted. This can be at least three times as fast as the fastest print speed, it being noted that the speed of each of the engines is a function of the time it takes to create and transfer the latent images and the time that is required to go through the fuser. In certain situations, with relatively simple images, this can be relatively fast, whereas complicated images may take more time. In any event, the printer buffer allows the image distributor to distribute an image to any one of the three print engines, 36, 38 and 40, but change the sequence of the output selection.

Figure 3:
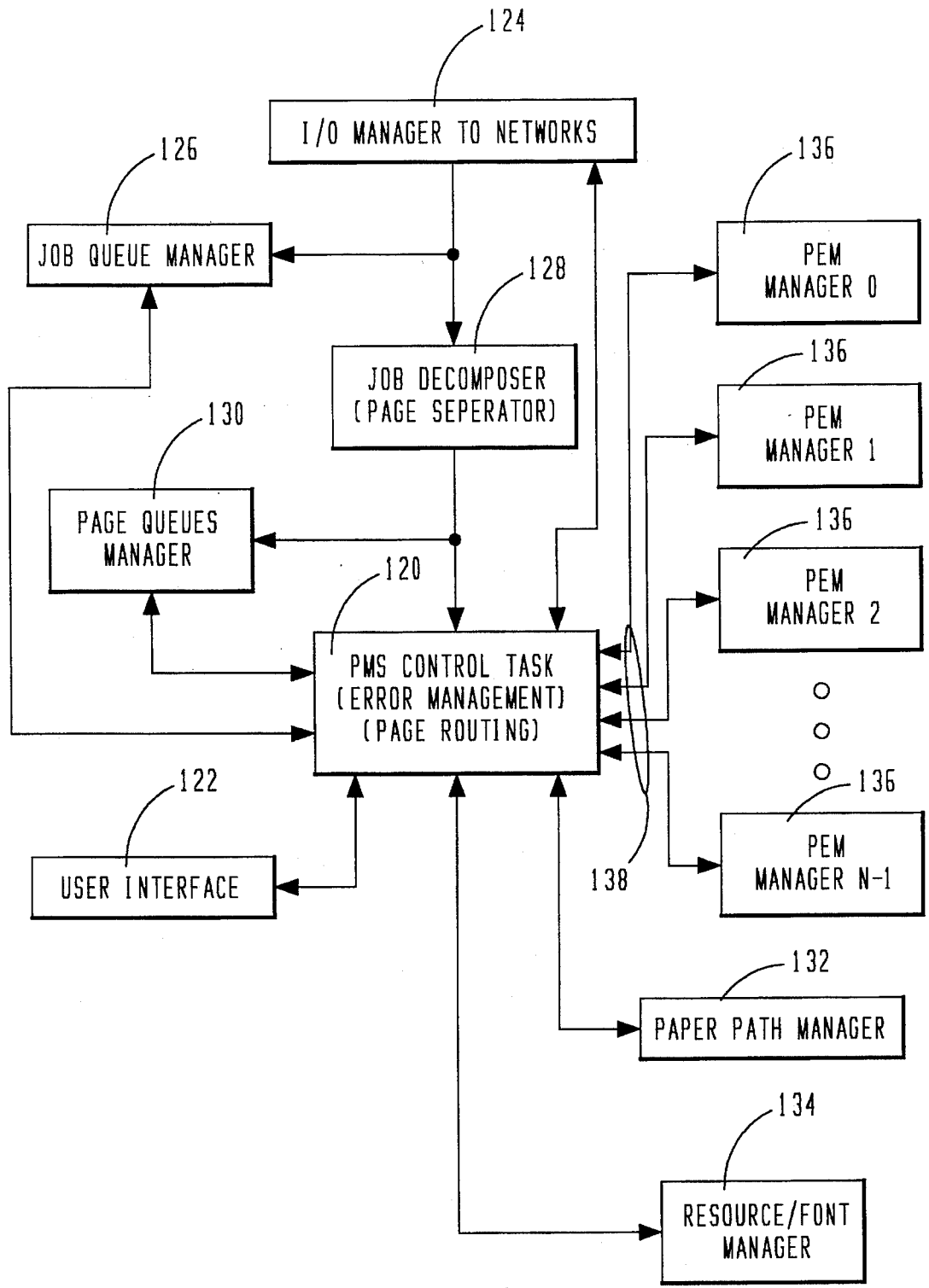
FIG. 3 illustrates a block diagram of the printer management system.

Referring now to FIG. 3, there is illustrated a block diagram of the print manager system (PMS) for controlling the overall operation of each of the print engines 36, 38 and 40. The overall page reading and error management tasks are controlled by a control task center, which is referred to as a "PMS Control Task" block 120. The PMS Control Task block 120 is interfaced with a user interface block 122 that allows a user to input data to the PMS Control Task block 120 in the form of controls, such as the number of copies to be printed, all sort operations, etc. Further, data can be downloaded from the user interface 122. When information is input to the system, it is input from an I/O manager 124 which is operable to receive the basic image information. The image information is then queued up in accordance with a job queue manager 126 and then, when the page is already printed, process it through a job decomposer (page separator) block 128. Once the job has been decomposed, i.e., separated into pages, the image is transferred to the PMS task block 120. In this operation, the block 120 interfaces with a page queue manager block 130, which page queue manager determines the job parsing algorithm, which defines the PM manager to which the page is to be routed. This is also controlled by a paper path manager block 132 and a resource/font manager 134.

The PMS control task block 120 is operable to interface with each of the print modules and print engines associated with the printing device which is referred to as PEM manager. A plurality of PEM managers, PEM Manager 0–PEM Manager n–1, are provided, and referred to by reference numerals 136. The connection between the PEM Manager to the associated PEM is via a high speed communication link 138. This can be any type of communication link that allows data to be transferred between the two systems. In general, each of the PEM managers can operate asynchronously and independently of the PMS Task Control block 120, it being noted that the PMS Task Control block 120 and all of the associated functions provided thereby are provided in a typical personal computer. It is only necessary that information be transferred to select ones of the PEM managers 136. Such communication links are conventional. The high speed link is a bi-directional parallel port utilizing conventional personal computers, an IEEE P 1284 or ECP extended capabilities port. Further, the PEM managers 136 could be configured such that they are integrated with the overall processor of the PMS Task Control block 120 and the associated PMS functions. This would merely require a multitasking operation to occur in one single computer with hardware connections to drive various logic circuitry on the print engine modules themselves.

Figure 4:
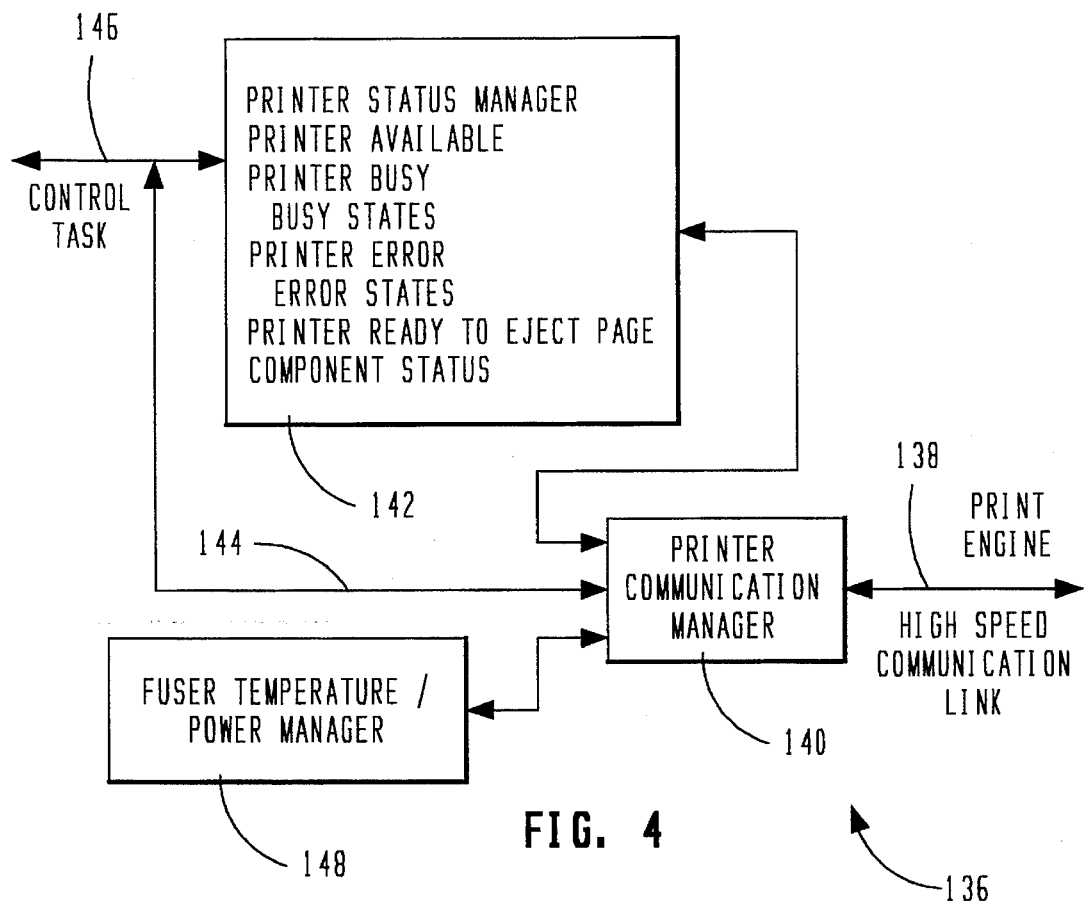
FIG. 4 illustrates a block diagram of the print engine manager.

Referring now to FIG. 4, there is illustrated a block diagram of the PEM operation. A printer communication manager 140 is provided which is operable to interface with a printer status manager 142 that determines the applications, such as when the printer is available, if the printer is busy, if there is a printer error, if the printer is ready to eject the page, or whatever the general component status is. The data is passed along a data path 144 which is operable to merge with the control task to a line 146 from the printer status manager 142 to output the task, which can be control of the printer, transfer of data, etc. Further, signals can be received back from the various systems indicating error states, eject status, etc. Further, the printer communication manager 140 is in contact with a fuser temperature/power manager 148, which provides overall control of the system, this being conventional. In general, the printer communication manager 140 is operable to receive from the print engine data and commands indicating what sheet of paper should be printed and whether a sheet of paper, after printing, is to be ejected from the print buffer 16. Further, this status can be relayed back to the print manager system.

Each of the print engine modules (PEM) is designed as an optimal low cost, high reliability and high print quality unit which, when assembled in multiples of the system configuration, exceeds the performance and reliability of a single print engine system at comparable overall page printing speeds including RIP times. Each of the modules includes an associated RIP and memory. Since the print engine module operates at a much lower speed than the overall output of the printing system, the cost and the reliability is much improved as that for a single high speed system. The print management system provides the ability to breakdown incoming jobs into its individual pages and to separate printing data (data flow) from media page (paper flow) operations and management within the system. Although the PMS allocates printing data to the respective PEM, the decision of which PEM, the timing of the release to printing and the media output flow through the server/collator is controlled by the PMS. When the image is routed to the PEM, it is input to the Raster Image Processor (RIP), associated with that PEM. This is a dedicated RIP which, from an overall system standpoint, results in parallel RIPs. As such, the system does not require one high speed RIP that would increase complexity; rather, multiple modified RIPs are provided which allow the overall system speed to be increased without surpassing the performance limitation of the current RIP technology levels that exist to support high speed page printing. This is particularly true for Page Description Language Processing. The PostScript Page Description Language is not suited for parallel processing to decrease the RIP time and current printer designs. The PostScript PDL which is not well suited for parallel processing is essentially paralleled by dividing a single job into several pages.

During operation, the PMS will provide the overall control of system access, utilization of the various modules, the job assignments to various modules and the output assembly of printing jobs that are dispatched to the system. Further, the PMS will act as a resource (font and bit map image, etc.) server for the system to determine what fonts are to be used and how the images are to be distributed. It also maintains knowledge of the PMS and PEM and job status to assure continuity from receipt, dispatch, interruption, recovery and completion of job assignments. If a job is too complex and non-conforming to break up into simple pages, it simply sends the entire job to a single PEM. The overall system can also send notices of job completion to the users and accumulate job status for allocating jobs to those users. Additionally, errors can be noted in the printing operation such that, for example, if one of the modules jams during a print operation, this print job can be returned to the PMS and the job sent to another printer for handling thereof.

By way of example, the following table will provide a comparison between the multiple printer system (MPS) and a tandem printing system. Table 1 illustrates the time in seconds for the RIP of each of the modules in the MPS to process a page of a ten page PostScript document for both the tandem system and the MPS system. It is noted that the tandem system provides a much faster per page time (2X).

TABLE 1

TOTAL RIP TIME

| Page | Total RIP Time | |
|---|---|---|
| | Tandem | MPS |
| 1 | 5 sec | 10 sec |
| 2 | 7 sec | 14 sec |
| 3 | 6 sec | 12 sec |
| 4 | 8 sec | 16 sec |
| 5 | 8 sec | 16 sec |
| 6 | 5 sec | 10 sec |
| 7 | 5 sec | 10 sec |
| 8 | 4 sec | 8 sec |
| 9 | 4 sec | 8 sec |
| 10 | 4 sec | 8 sec |
| Total | 56 sec | 112 sec |

The tandem technology printer, as described above, provides a station for each color, such that once the multiple colors have been processed, the time for a given page essentially equals that of a single page. By comparison, each of the PEMs in the MPS processes a page for a much longer time. It should be noted that each of the pages in the PostScript document is different, resulting in different times.

From Table 1, it can be seen that it take approximately 56 seconds to complete the job on the tandem printer. The RIP processing time is the limiting factor in this case since most of the pages take more than 4 seconds to RIP while the page print speed, which is overlapped with processing, is approximately 3 seconds. By comparison, if the MPS system operated in a serial manner, it would take 112 seconds. However, the MPS does not operate in a serial manner; rather it operates in a parallel manner.

Figure 5:
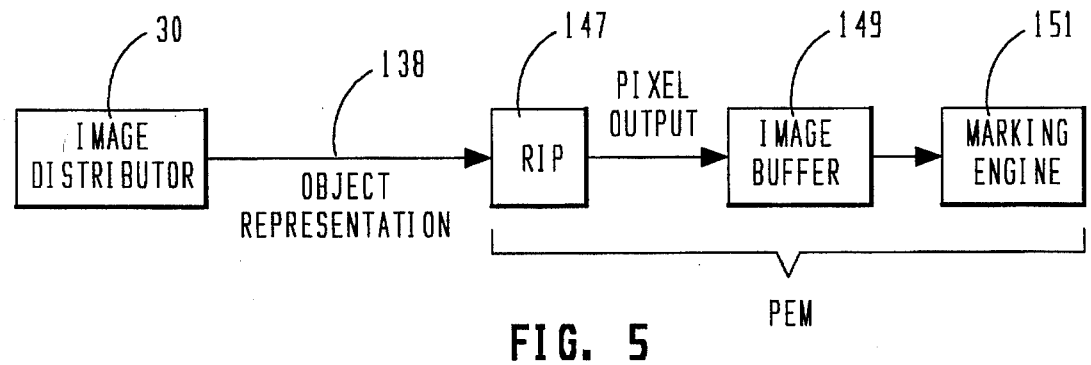
FIG. 5 illustrates a block diagram of the image flow from the image distributed to the marking engine.

Referring now to FIG. 5, there is illustrated a block diagram of the overall operation of transferring information from the image distributor 30 to the PEM. In general, the PEM contains a RIP 147, an image buffer 149 and a marking engine 151. The process flow of FIG. 5 is directed toward a single PEM. Initially, the image distributor 30 is operable to receive the image information and create an object representation thereof. This object representation is what is transferred to the PEM. A single one of the high-speed transmission paths 138 is illustrated for carrying the object representation to the PEM. At the PEM, the object representation is received by the RIP 147. The RIP 147 is then operable to convert the object representation to a pixel representation. This pixel output will represent the image and this image is stored in an image buffer 149. The overall print operation of the print engine module is performed by a "marking engine" 151, which marking engine 151 is generally comprised of the mechanical components necessary to form a latent image, develop that latent image and then transfer it to an image carrier.

When forming the object representation of the image, the image distributor 30 determines what information is necessary to include in the object representation. The particular print file type for the document, i.e., PostScript, PCL, etc., is encoded into the object representation, along with the necessary overhead associated with that image file. This overhead is the information regarding font types, particular printer control information, etc. that is necessary in order for the printer engine module to properly process the image file. For example, each printer engine module may have "resident" fonts associated therewith. However, there are some fonts which are referred to as "soft fonts", which are downloaded as software to the printer engine module and maintained in volatile memory. If this type of font is required, it is necessary to load the font into the volatile memory at sometime in the operating process. Of course, if memory is not a problem, each printer module could be initialized upon power up with all necessary fonts. However, with the large number of fonts that exist in printers today, the typical procedure is to select the necessary fonts that are required for a particular page and then transmit these to the printer along with the page information. It should be noted that this is somewhat different from processing a document as a whole with a single printer since this method only requires the fonts to be transmitted to the printer upon initiation of the print job and load them in the volatile memory. Thereafter, each page can be processed without requiring the files to again be downloaded at the beginning of the page.

Referring now to FIG. 6, there is illustrated a timing diagram for comparison between the tandem printer and the quad-print engine MPS printer. The timing diagram is incremented in increments of 2 seconds. In the first 2 second increment, the tandem printer initiates page 1 and the MPS printer initiates pages 1–4. In the 6 second timeslot, the tandem printer finishes page 1 and begins page 2. In the 8–10 second timeslot, the MPS printer finishes page 1 and begins page 5 with page 1 ejected. In the 10–12 second timeslot, the tandem printer finishes page 2 and begins page 3, whereas the MPS printer finishes page 3 and begins page 6. In the 12–14 second timeslot, the MPS printer finishes page 2, begins page 7 and ejects pages 2 and 3. In the 14–16 second timeslot, the MPS printer finishes printing page 4, begins printing page 8 and ejects page 4. In the 16–18 timeslot, the tandem printer finishes page 3 and begins page 4. In the 20–22 timeslot, the MPS printer finishes page 6 and begins page 9 and, in the 22–24 timeslot, the MPS printer finishes page 7, finishes page 8 and begins page 10. In the 26–28 second timeslot, the MPS finishes page 5 and ejects pages 5, 6, 7 and 8, whereas the tandem printer finishes page 4 and begins page 5. In the 28–30 second timeslot, the MPS printer finishes page 9 and ejects page 9. In the 30–32 second timeslot, the MPS printer finishes page 10 and ejects page 10. The tandem printer continues printing until it finishes page 10 in the 54–56 second timeslot. It can be seen that the MPS printer, operating in parallel, finishes the print job after 32 seconds, whereas the tandem printer required 56 seconds.

The distribution of the print jobs and the eject operations are controlled by a job parsing algorithm. This job parsing algorithm requires that the print buffer be present such that the eject time can be selected, and this eject time is done at a faster speed than the actual print operation paper flow for each module in the MPS printer. For example, it can be seen that page 3 in the above example, associated with FIG. 6, was finished in the 10–12 timeslot, whereas it was not ejected until the 12–14 second timeslot. Further, it can be seen that page 6 was actually finished printing in the 20–22 second timeslot and page 5 was finished printing in the 24–26 second timeslot, but page 6 and page 5 were ejected during the same timeslot, the 20–26 second timeslot. Therefore, the job will be output in the same sequence that it was initiated. The difference between the tandem operation and the MPS printer operation is due to the fact that the tandem unit would perform the job in a page-by-page sequence, overlapping RIP operations with printing after the first page was printing. On the MPS printer, the job is split up by the PMS as it is received, sending page information to the PEMs in a predetermined order.

In a monocolor example, a single color page may be printed in, for example, a job batch of 100 copies. If the RIP time for the page is 10 seconds for the tandem unit and 20 seconds for the MPS printer, the tandem unit will print the monocolor pages at 20 pages per minute. The MPS PEMs each print monocolor at 16 pages per minute. The time to complete the job in the tandem unit is equal to the RIP time for each page, incurred just once, plus the time to print the 100 pages. The total elapsed job time is 10 seconds RIP time plus 100 pages at the 20 pages per minute rate of speed of the tandem unit, i.e., 5 minutes and 10 seconds. With the MPS printer, all four PEMs will operate in parallel. The time to complete the job is equal to the PEM RIP time, incurred just once in parallel, plus the time to print the 100 pages—25 pages per PEM. The total elapsed time is 20 seconds RIP time plus 25 pages at the 16 pages per minute monocolor print speed of the PEMs—1 minute and 35 seconds. The job is completed about three times faster than the tandem engine.

If a full color copy is to be printed on a job batch of 100 copies for a single color page, the tandem printer job time is exactly the same as the monocolor example, which is 5 minutes and 10 seconds. However, the MPS operates to utilize all four PEMs in parallel. The time to complete the job with the MPS printer is equal to the PEM RIP time incurred just once in parallel, plus the time to print the 100 pages—25 pages per PEM. However, the print speed for four color pages on each PEM is 4 pages per minute. Therefore, the total elapsed job time is 20 seconds RIP time plus 25 pages at the 4 pages per minute four color print speed of the PEMs—6 minutes and 27 seconds. The job is completed about 20% faster on the tandem engine.

In general, the MPS provides a significant improvement over the tandem system for typical jobs that include both text and graphics. Since most jobs that include the text and graphics result in a page RIP time that is usually longer than the rated printing time, the MPS system would be approximately two times faster than the high performance tandem unit for both monocolor and full color jobs. If a page of the jobs were simple cached text and the limiting factor was the printing speed, the MPS system would be about three times faster for monocolor and a bit slower for full color than a 20 page per minute tandem printer. However, it should be noted that no RIP implemented with present technology can keep up with the 20 per minute page full color engine. If more MPS performance is needed, speed or capacity could be achieved by increasing the number of PEMs in its configuration.

Figure 7:
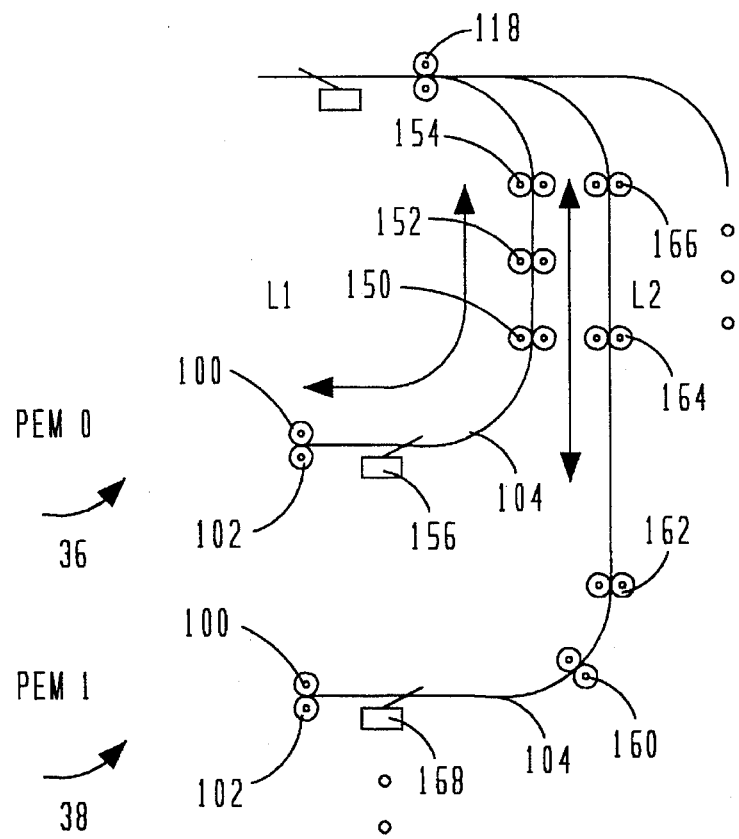
FIG. 7 illustrates a diagram of the paper feed device on the output illustrating the print buffer.

Referring now to FIG. 7, there is illustrated a block diagram of the paper feed path. Only two of the PEMs are illustrated, the first PEM 36 and the second PEM 38. The paper path 104 in the buffer for the first PEM 36 has three sets of rollers, 150, 152 and 154, associated therewith, the set of rollers 154 being the exit set of rollers for the print buffer for the PEM 36. Each of the roller sets 150, 152 and 154, is comprised of a driven roller and an idler roller to form a nip therebetween. The distance between the nip in the roller 154 and the nip between the fuser rollers 100 and 102 is greater than the length L1, which represents the longest length of paper to be processed by the print engine. As such, paper can be fed into the print buffer such that it is held in the nip at the rollers 154 but has exited the nip between the fuser rollers 100 and 102. An exit sensor switch 156 is provided at the input to the paper path 104 at the buffer associated with the PEM 36 to indicate that paper is present in the print buffer and has exited the fuser.

When paper is input to the print buffer, it is moved at the speed of the PEM 36. Therefore, the speed at which the fuser rollers 100 and 102 passes the paper therefrom defines the speed at which the print buffer can be loaded. Therefore, the rollers 150, 152 and 154 must operate at that speed during the load operation. Upon merging of the documents into the merge roller 118 and the nip therebetween, the system operates at a higher speed. During this operation, the rollers 154 must operate at the higher speed which, for a three PEM MPS is three times the speed of a single PEM. The rollers 154 must operate at the higher speed, and therefore, the driven roller is driven by a two-speed motor. The rollers 150 and 152 can operate as one speed motors with overrun clutches to allow the paper to be pulled therefrom at the higher speed. Further, they could utilize two-speed motors on the driven roller.

The paper path 104 associated with the PEM 38 is illustrated as having four sets of rollers associated therewith, rollers 160, rollers 162, rollers 164 and rollers 166, rollers 166 comprising the exit rollers of the print buffer for the PEM 38. An exit paper sensor 168 is provided at the output of the fuser rollers 100 and 102 for the PEM 38. As was the case with the buffer for the PEM 36, the rollers 166 operate on two speeds. The distance between the exit rollers 166 and the nip at the fuser rollers 100 and 102 might be greater than the length of the longest sheet of paper, this being represented as a length L2. Of course, the configuration illustrated in FIG. 6 shows a much longer paper path 104 for PEM 38 as compared to PEM 36. However, the merge point could be distributed along the length of the MPS and does not necessarily have to be a single point on the exit rollers 118.

There could be multiple merge points. Further, the PEMs do not have to be stacked and there could be a much more complex merge mechanism or combiner 20.

Figure 8:
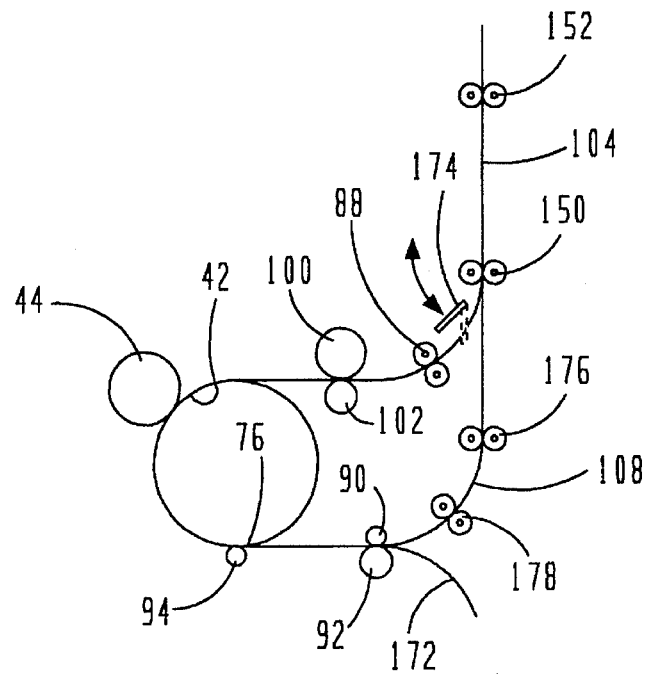
FIG. 8 illustrates a detail of the duplex paper feed operation.

Referring now to FIG. 8, there is illustrated a detail of the duplex path operation. In a normal operation, the paper is extracted from the bin via a paper path 172 and fed into the nip between the precurl rollers 90 and 92 and then into the attachment 76 and then onto the transfer drum 42 for receiving the transferred image, after which it is passed to the fuser between rollers 100 and 102 and then passed outward to the print buffer paper path 104. The rollers 88 are operable to pull the paper up into the print path 104 with a paper deflector mechanism 174 being disposed in a non-interfering position such that paper can be removed from the fuser rollers 100 and 102 and placed into the print buffer paper path 104. In a duplex operation, the rollers in the print buffer paper path 104, rollers 150 and 152 for the PEM 36, are then operable to reverse direction. In this mode, the paper deflection mechanism 174 is disposed downward to force the paper along the duplex paper path 108. Two sets of rollers, rollers 176 and rollers 178, control the flow of the paper along this path to direct it to the nip between the precurl rollers 90 and 92. Since the trailing edge of the paper in the first path now becomes the leading edge, the paper is effectively turned over such that an image can be disposed on the opposite side thereof. Thereafter, the operation takes place in a normal manner and the paper is then placed in the print buffer paper path 104.

Figure 9:
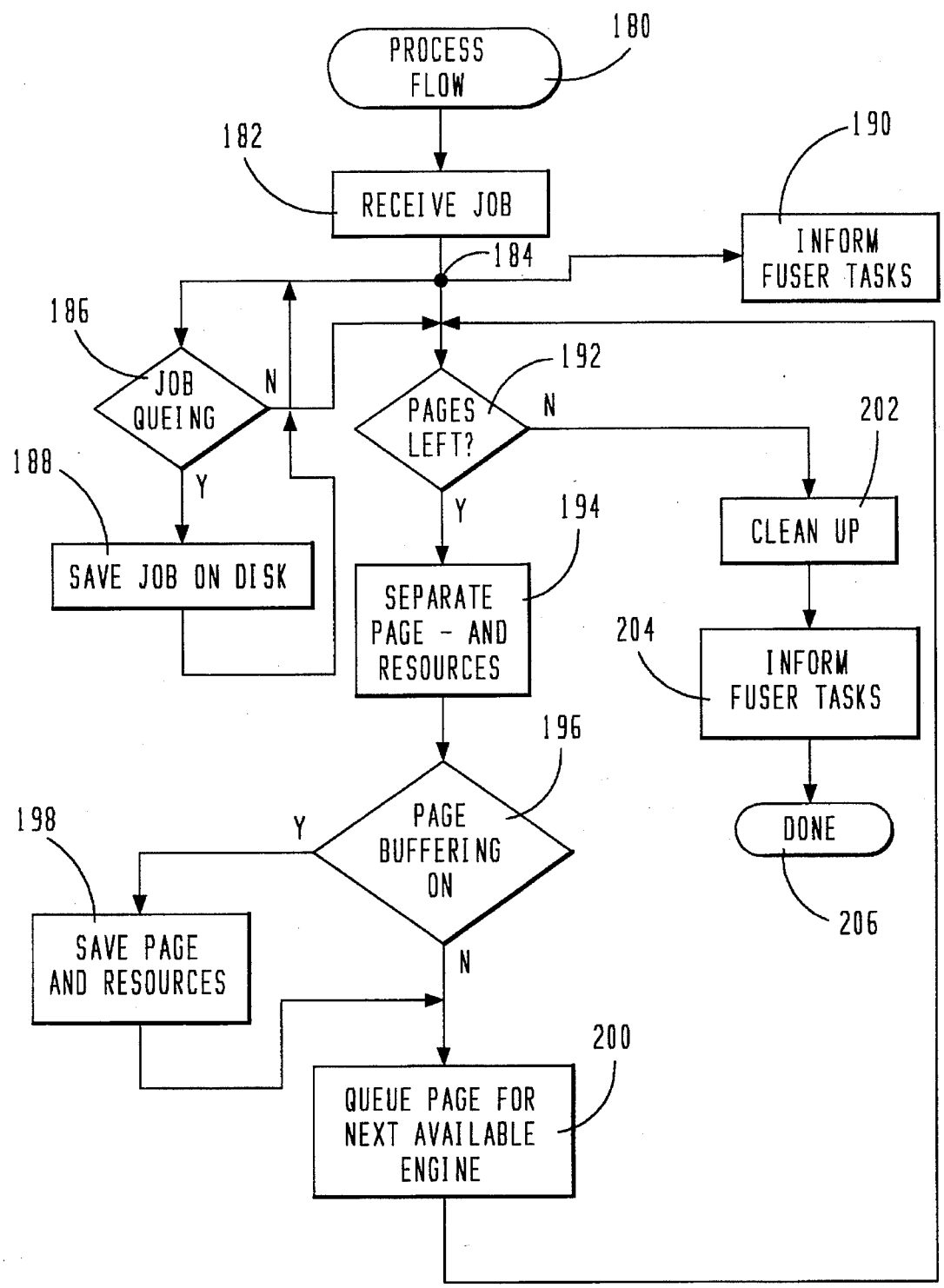
FIG. 9 illustrates a flowchart for the overall process flow.

Referring now to FIG. 9, there is illustrated a flowchart depicting the operation of the overall process flow. The program is initiated at a block 180 and then proceeds to a function block 182 to receive the job. Initially, the job is converted to an appropriate object file in the case where a printer application is present. For example, the object file could be a PCL file. With respect to a copier application, this would typically be a pixel file, since the pixels are directly read from a CCD scanner and can therefore be directly input to the printer. The program then flows to a node 184 which has three parallel paths therefrom. The first path flows to a decision block 186 to determine if there is a job queuing period. If so, the program will flow to a function block 188 to save the job on disk for the purpose of providing a backup thereto. The program then flows to the node 184. If a job is not queuing, the program will also flow from a decision block 186 to node 184. A second path from the node 184 flows to a function block 190 to perform the fuser tasking operations which are basically directed towards power management of the fusers, which operation will not be described herein.

The program flows from the node 184 along a main path to a decision block 192 to determine if any pages are left to be processed. If so, the program will flow along the "Y" path to a function block 194 to separate the pages and then add resources, i.e., start up another print engine. The program will then flow to a decision block 196 to determine if page buffering is on. If page buffering is on, the program will flow along a "Y" path to a function block 198 to save the page and the associated resources, the resources being the various parameter information that follows the page through the processing such as the font information associated with the page, etc.. The program will then flow to the output of decision block 196. The buffering process allows the page to be saved for the purpose of printing it at a later time or for printing multiple copies. If the page buffering is not on, the program will flow from the decision block 196 to a function block 200 to queue the page for the next available engine and then back to node 184.

When all pages have been queued up, the program will flow to a function block 202 along the "N" path from the decision block 192 to perform a cleanup operation. The program will then flow to a function block 204 to perform the fuser tasks and then to a Done block 206.

Figure 10:
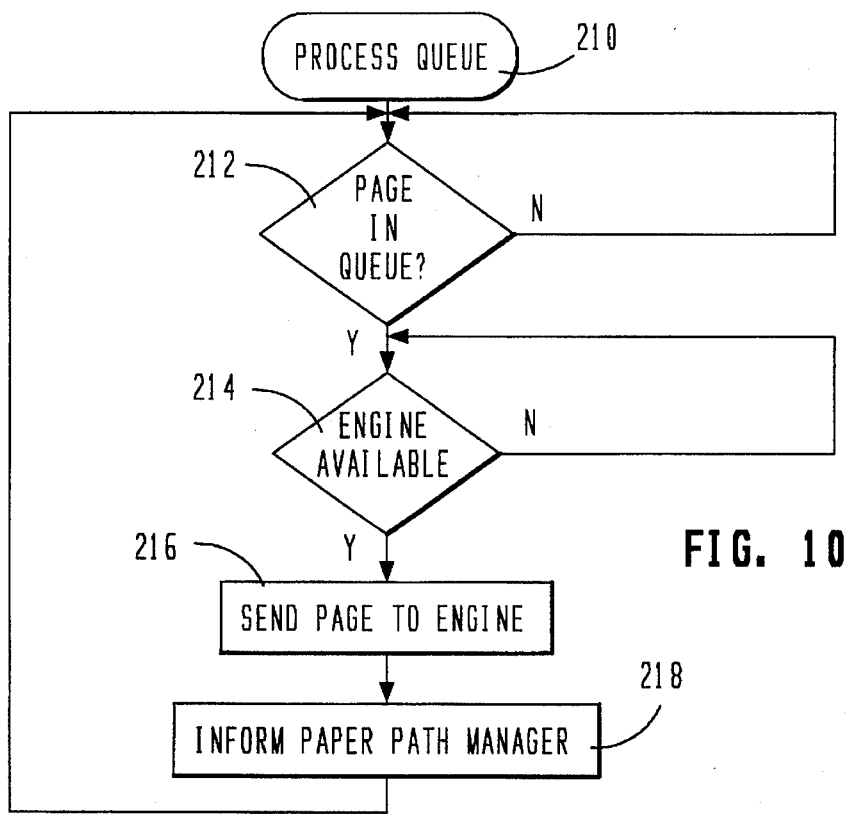
FIG. 10 illustrates a flowchart for the process queue.

Referring now to FIG. 10, there is illustrated a flowchart depicting the processing operation of the pages in the queue. The program is initiated at a block 210 and then flows to a decision block 212 to determine if there is a page in the queue. If not, the program will flow back to the input of decision block 212 along the "N" path thereof until a page has been disposed in the queue. At this time, the program will flow along the "Y" path to a decision block 214 to determine if there is an available engine. If not, the program will flow along the "N" path back to the input of decision block 214. When an engine becomes available, the program flows along the "Y" path from decision block 214 to a function block 216 to send a page to the print engine. In the case of a printer, this could be a PCL file or a PostScript file, and in the case of a scanned image in a copier application, this could be a pixel file. This is all achieved over a high speed data link. The program will then flow to a function block 218 to inform the paper path manager that the page has been sent. The program then flows back to the input of decision block 212.

Figure 11:
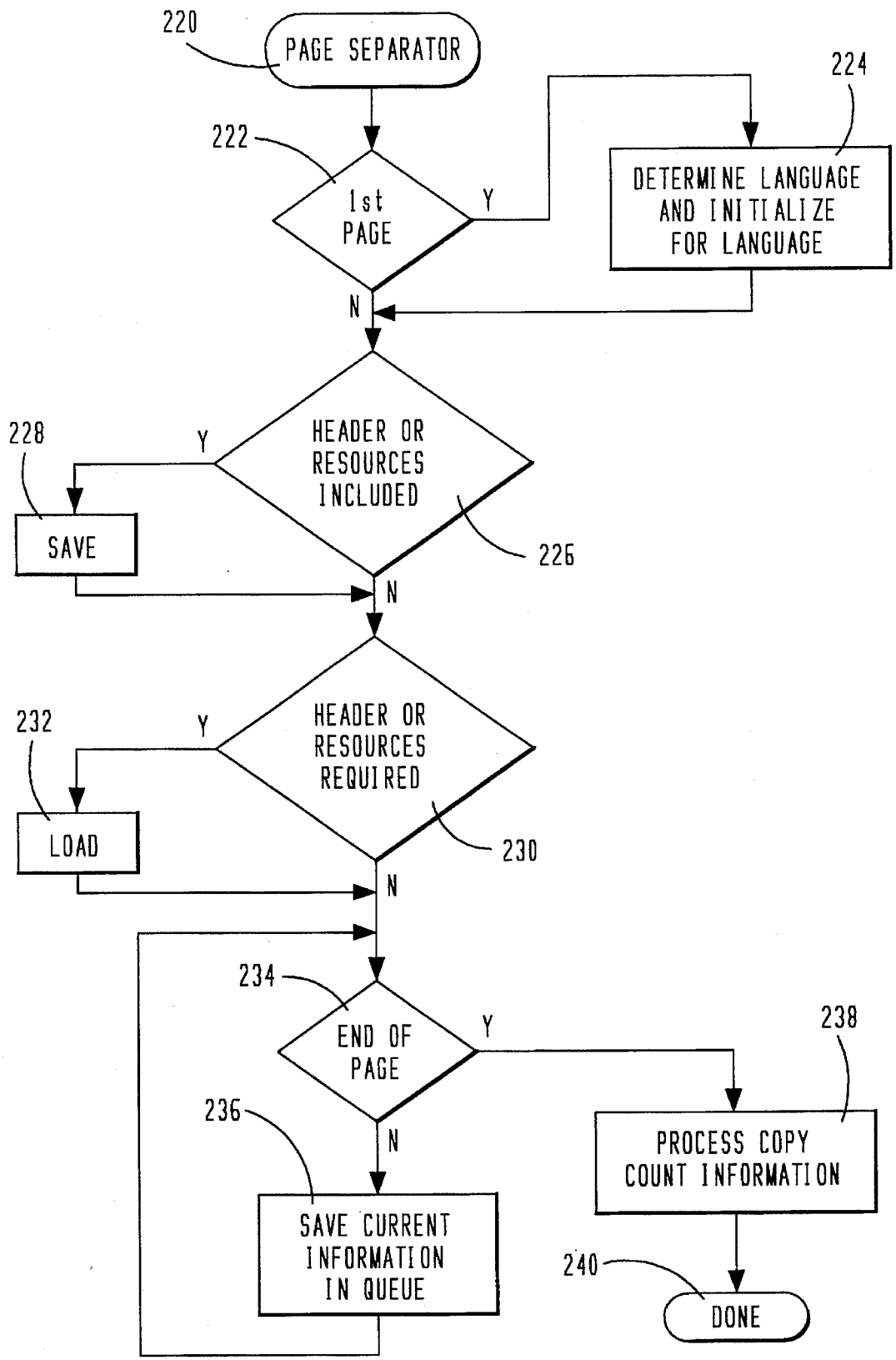
FIG. 11 illustrates a flowchart for the page separator.

Referring now to FIG. 11, there is illustrated a flowchart depicting the operation of the page separator. The program is initiated at a block 220 and then flows to a decision block 222 to determine if the page is the first page. If so, the program flows along the "Y" path to a function block 224 to determine the language of the object file that is received and to initialize the printer for that language. If, for example, the language were PostScript, it would be important that the RIP operate under this language. The program would then flow back to the output of decision block 222. If the received page was not the first page, the program flows along the "N" path from the output of the decision block 222 to the input of a decision block 226 to determine if the header or resources were included in the page. If so, the program flows along a "Y" path to a function block 228 to save the header or resource and then to the output of decision block 226. If no header or resources are included, the program flows from the output of decision block 226 along the "N" path thereof to a decision block 230 to determine if the header or resources are required for this page, i.e., font information, etc. If so, the program flows along a "Y" path to a function block 232 to load the header resources and then back to the output of the decision block 230. If a header or resources are not required, the program flows along the "N" path from the output of decision block 230 to the input of a decision block 234 to determine if the end of the page has occurred. If not, the program flows along the "N" path to a function block 236 to save the current information in the queue and then back to the input of the decision block 234.

The function block 236 represents an operation wherein a single page can be buffered in the event that a signal has not been received from the print engine indicating that the page has been printed, i.e., an end of page signal. If the end of page signal is not received, this indicates that the printer has jammed or there has been some error in the printing operation. If so, the information is still stored and it can be retransmitted to a separate engine. However, once the end of a page has been received, this indicates that the page has been printed and is stored in the appropriate print buffer. The program would then flow along the "Y" path from the decision block 234 to the input of a function block 238 to process the copy count information and then to a Done block 240.

Figure 12:
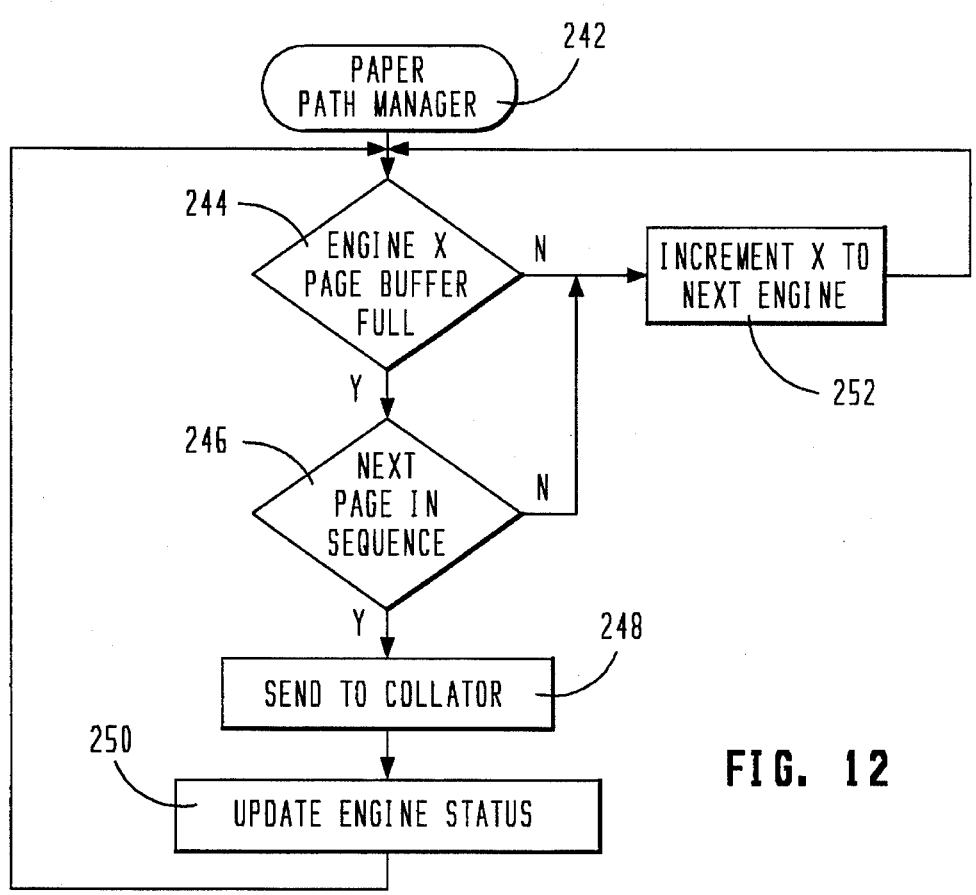
FIG. 12 illustrates a flowchart for the paper path manager.

Referring now to FIG. 12, there is illustrated a flowchart depicting the operation of the paper path manager. The program is initiated at a block 242 and then proceeds to a decision block 244 to determine if the page buffer in the selected engine is full. If so, the program will flow to a decision block 246 to determine if the received page is the next page in the sequence. If so, the program flows along the "Y" path to a function block 248 to send the buffered page to the collator and then to a function block 250 to update the empty status as having an empty buffer. If the page buffer in the selected engine was full, the program would flow along an "N" path from the decision block 244 to a function block 252 to increment the system to select the next engine in the sequence and then back to the input of decision block 244. This would also be the case if it were determined that the page was not the next page in the sequence, wherein the program would flow from the decision block 246 along the "N" path to the input of function block 252.

Figure 13:
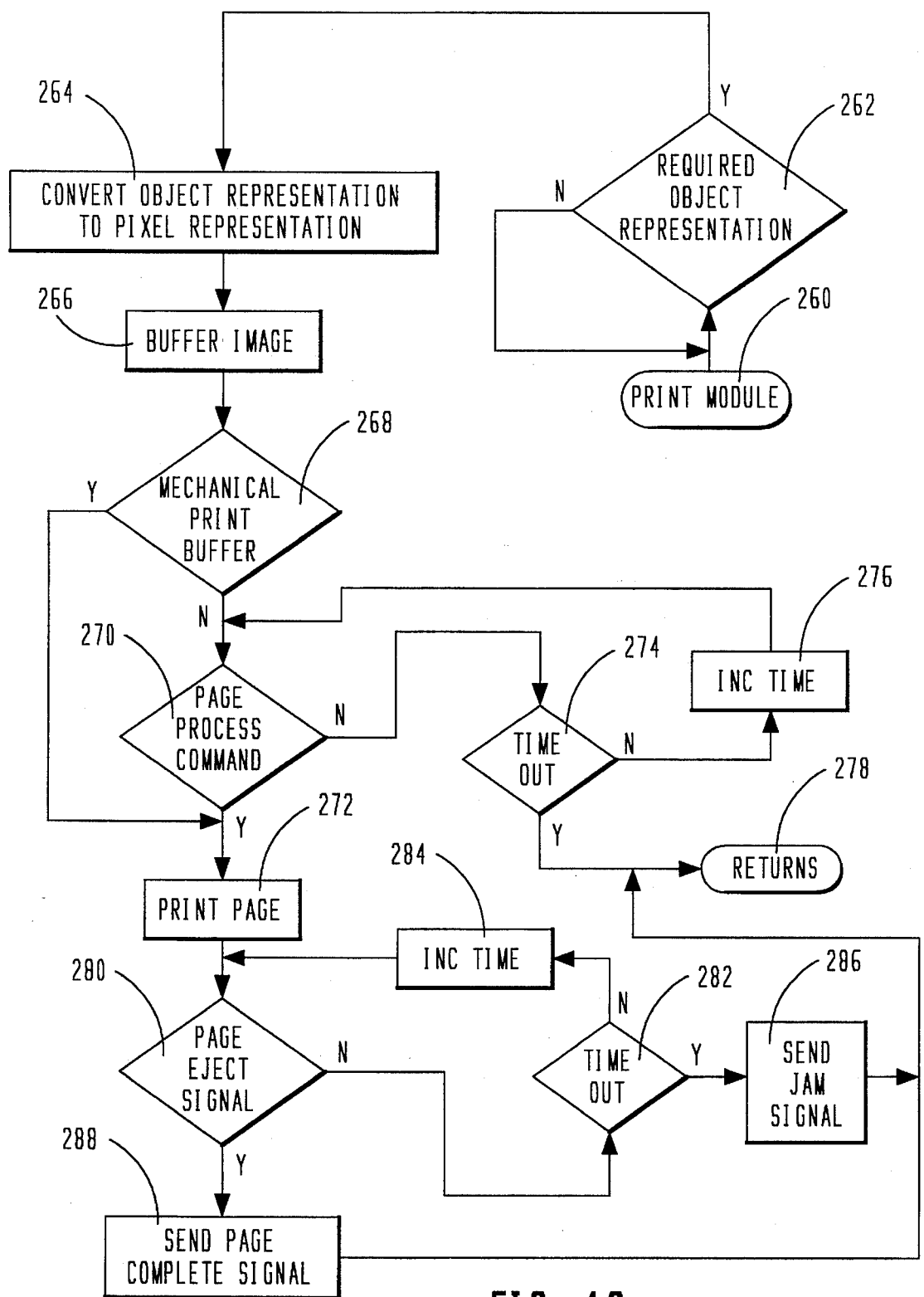
FIG. 13 illustrates a flowchart for the print manager operation.

Referring now to FIG. 13, there is illustrated a flowchart depicting the operation of the print module. The program is initiated at a block 260 and then proceeds to a decision block 262 to determine if the object representation of the image has been received. If not, the program flows along an "N" path back to the input of decision block 262. When received at the PEM, the program will flow from decision block 262 along the "Y" path to a function block 264 to convert the object representation to a pixel representation. This is achieved in the RIP 147 associated with that PEM. The image is then buffered, as indicated by a function block 266 and then the program flows to a decision block 268. The decision block 268 determines whether the printer is operating with a mechanical print buffer. In certain situations, the use of a mechanical print buffer may significantly increase the cost. In this situation, the page can merely be maintained in the image buffer 149 preceding the marking engine 151 until it is necessary to print that document. By knowing the speed of the print engine, it is then possible to calculate the time from initiation of the print operation in the print engine to the completion thereof and subsequent ejection of the paper therefrom. In this manner, it would not be necessary to buffer the pages in an output mechanical print buffer.

If the mechanical print buffer is present, the program will flow along the "Y" path from the decision block 268 to a function block 272 to print the page. However, if a recurrent mechanical print buffer was not being utilized, the program would flow from the decision block 268 along the "N" path to a decision block 270 to determine if the page process command had been received from the PMS control task block 120. If not, the program would flow along the "N" path to a decision block 274 to determine if a timeout had occurred. If not, the program would flow along an "N" path to a function block 276 to increment the time counter for the timeout function and then back to the input of decision block 270. The system continues in this loop until the timeout counter had incremented to a maximum value, at which time the program would flow from the decision block 274 along the "Y" path to a return block 278.

Once the page process command has been received, the program proceeds along the "Y" path to the Print Page function block 272 to proceed with the operation. As described above, proceeding along the path including the decision block 270 indicates that there is no mechanical print buffer disposed on the output of the system. Therefore, when the page is printed, it will be ejected into the final output paper path; thus, the control system must determine when the page process command is transmitted, which is a function of the processing operations of the PEMs and the time required for this particular page to be processed by this particular PEM.

After a program has proceeded to the Print Page block 272, the marking engine 151 proceeds to process the image and print it onto the image carrier, i.e., the paper. The program then proceeds to a decision block 280 in order to determine if a page eject signal has been generated. If not, the program proceeds along an "N" path to a decision block 282 to determine if a timeout counter has reached maximum. If not, the program flows to a function block 284 to increment the timeout counter and then back to the input of decision block 280. When the timeout counter has reached maximum value, the program flows along a "Y" path from the decision block 282 to a function block 286 to transmit a JAM signal back to the PMS Task Manager 120 to the return block 278. However, if a page eject signal has been received by the PEM, the program proceeds along the "Y" path from the decision block 280 to a function block 288 in order to send a Page Complete signal back to the PMS task manager 120, and then to a return block 278.

In summary, there has been provided a multiple print engine system which utilizes a plurality of print engine modules, each print engine module constituting a complete print engine which is operable to receive an image file or an object file, select an image carrier such as paper from a dedicated paper bin and create and print an image onto the paper. The paper is then disposed in a print buffer associated with that print engine module. An output combiner or collator is then controlled to selectively assemble the products in the print buffer. An image distributor is operable to determine which of the print engine modules is to receive which of the pages to be printed. By processing the images in parallel, each of the print engine modules can utilize a higher quality slower speed engine with the overall print speed being equivalent to that of a very high speed print engine.

Although the preferred embodiment has been described in detail, it should be understood that various changes, substitutions and alterations can be made therein without departing from the spirit and scope of the invention as defined by the appended claims.

What is claimed is:

1. A multiple print engine, comprising:
   a plurality of electrophotographic print engine modules, each of said print engine modules operable to receive an image file corresponding to an input sheet image and for printing the input sheet image on an image carrier for output therefrom;
   a plurality of print buffers, each associated with the output of at least one of said print engine modules, and each of said print buffers operable to receive the output of the associated one of said print engine modules as a completed print job; and
   an output collator for selectively retrieving the output of each of said plurality of print buffers in accordance with a predetermined output sequence.

2. The multiple print engine of claim 1, wherein said output collator is operable to route the output of each of said plurality of print buffers after retrieval thereof to a single output.

3. The multiple print engine of claim 1, and further comprising an image distributer for receiving a plurality of the input sheet images and dividing each of the input sheet images into an image file compatible with each of said print engine modules and routing the image files to select ones of said print engine modules in a predetermined input sequence.

4. The multiple print engine of claim 3, and further comprising a print manager for determining the predetermined output sequence in which said output collator selectively retrieves the output of each of said plurality of said print buffers.

5. The multiple print engine of claim 4, wherein the predetermined sequence of said output collator comprises the input sequence in which the input sheet images were input to said image distributor.

6. The multiple print engine of claim 3, and further comprising a prim completion indicator for indicating when one of said print engine modules has completed a print job and is ready to receive another of the image files from said image distributor.

7. The multiple print engine of claim 6, and further comprising a failure indicator for indicating when one of said print engine modules does not complete a print job.

8. The multiple prim engine of claim 7, and further comprising an image buffer for buffering the image files such that when said failure indicator indicates that one of said print engine modules does not complete a print job, an associated one of the image files can be forwarded to another one of said print engine modules for processing of the associated one of the image files.

9. The multiple print engine of claim 3, and further comprising a print manager for determining the predetermined output sequence in which said output collator selectively retrieves the output of each of said plurality of said print buffers.

10. The multiple print engine of claim 1, wherein the image carrier comprises paper.

11. The multiple print engine of claim 1, wherein only one of said print buffers is associated with each of said print engine modules.

12. The multiple print engine of claim 1, wherein each of said print engine modules operates at a first speed and said output collator operates at a second and faster speed than said first speed.

13. The multiple print engine of claim 1, wherein at least one of said print engine modules comprises a multi-pass print engine module operable to create multiple-pass images on said image carrier.

14. A multiple print engine, comprising:
   a plurality of electrophotographic print engine modules, each of said print engine modules operable to receive an image file corresponding to an input sheet image and for printing the input sheet image on an image carrier for output thereof;
   a plurality of input image buffers, each associated with an image input of at least one of said print engine modules, each of said image buffers operable in response to a page process command to transfer the stored image file therein to said image input of said associated print engine modules for processing thereof to provide on an output of said associated print engine module a completed print job;
   a control system for generating the image files and distributing the generated image files to select ones of said image buffers on select ones of said print engine modules, said control system operable to generate and transfer to each of said print engine modules a page process command in a predetermined order.

15. The multiple print engine of claim 14, and further comprising a print completion indicator for indicating one of said print engine modules has completed a print job and is ready to receive another one of the image files.

16. The multiple print engine of claim 15, and further comprising a failure indicator for indicating when one of said print engine modules does not complete a print job.

17. The multiple print engine of claim 14, wherein said image carrier comprises paper.

18. The multiple print engine of claim 14, wherein only one of said input image buffers is associated with each of the said print engine modules.

19. The multiple print engine of claim 14, wherein each of said print engine modules is operable to operate at different speeds.

20. The multiple print engine of claim 14, wherein at least one of said print engine modules comprises a multi-pass print engine module operable to create multiple-pass images on said image carrier.

21. A method for processing images in a parallel manner, comprising the steps of:

distributing a plurality of image files, each corresponding to an input sheet image, to select ones of a plurality of electrophotographic print engine modules;

receiving at the select ones of the print engine modules the distributed image files, which distributed image files correspond to the input sheet images;

printing the sheet images corresponding to the received image files on image carriers with each of the print engine modules and outputting the image carriers with the printed sheet images thereon from the associated ones of the print engine modules;

buffering the output image carriers from each of the print engine modules in one of a plurality of print buffers that is associated with the associated outputting one of the print engine modules; and selectively retrieving the output of each of the plurality of buffers in accordance with a predetermined output sequence.

22. The method of claim 21, wherein the step of selectively retrieving the output of each of the plurality of print buffers comprises routing the output of each of the plurality of print buffers after retrieval thereof to a single output.

23. The method of claim 21, and further comprising the steps of:

receiving a plurality of the input sheet images;

converting each of the input sheet images into an associated image file compatible with each of the print engine modules; and routing the image files to the select ones of the print engine modules in accordance with the step of distributing.

24. The method of claim 23, and further comprising the step of determining the predetermined output sequence by which the step of selectively retrieving the output of each of a plurality of print buffers operates.

25. The method of claim 24, wherein the step of distributing operates in accordance with a predetermined input sequence of receiving.

26. The method of claim 23, and further comprising, indicating when one of the print engine modules has completed a print job and is ready to receive another one of the image files, wherein the step of distributing is operable to distribute the other one of the image files to the print engine module.

27. The method of claim 26, and further comprising indicating when one of the print engine modules does not complete a print job.

28. The method of claim 27, and further comprising buffering the image files in an image buffer such that when the step of indicating indicates that when one of the print engine modules has not completed a print job, the associated one of the image files can be forwarded to another one of the print engine modules for processing of the associated one of the image files as an image.

29. The method of claim 23, and further comprising the step of determining the predetermined output sequence.

30. The method of claim 21, wherein the step of printing the sheet images onto the image carriers comprises processing the image files to print an associated one of the sheet images onto paper.

31. The method of claim 21, wherein the step of printing with the print engine modules is operable to process at a first speed, and the step of selectively retrieving operates at a faster speed than said first speed.

32. The method of claim 21, wherein the step of printing with each of the print engine modules comprises printing one of the sheet images associated with an associated one of the image files with at least one of the print engine modules to perform a multi-pass print operation to create multiple-pass images on a respective one of the image carriers.

* * * * *

UNITED STATES PATENT AND TRADEMARK OFFICE
CERTIFICATE OF CORRECTION

PATENT NO. : 5,596,416
DATED : January 21, 1997
INVENTOR(S) : Barry et al

It is certified that error appears in the above-identified patent and that said Letters Patent is hereby corrected as shown below:

In the Claims:

Claim 6, column 16, line 11, delete "prim", and insert therefor --print--.

Signed and Sealed this

Nineteenth Day of August, 1997

Attest:

BRUCE LEHMAN

Attesting Officer

*Commissioner of Patents and Trademarks*